Patented Mar. 15, 1938

2,110,973

UNITED STATES PATENT OFFICE 2,110,973

COMPOUNDS OF THE TRIARYLMETHANE SERIES AND PROCESS OF PREPARING THEM

Percy Thomas Gale and Wilfred Archibald Sexton, Blackley, Manchester, England, assignors to Imperial Chemical Industries Limited, a corporation of Great Britain No Drawing. Application September 12, 1935, Serial No. 40,344. In Great Britain September 14, 1934

19 Claims. (Cl. 260—64.5)

The present invention relates to the manufacture of new compounds suitable for the preparation of light-sensitive layers and to their use for this purpose.

We have discovered that the new compounds included under the generic term 4:4'-diamino-2:2'-5:5'-tetraalkoxy-triphenylmethane when tetrazotized are eminently suited for the production of light-sensitive layers and that by suitable development of such layers which have been exposed under a pattern, e. g. a drawing, a photographic positive or negative or the like, excellent prints of a colour varying with the nature of the developer may be obtained.

The light-sensitive layer is prepared on a suitable base, usually a paper base. After exposure the picture is developed preferably by treating the layer with a suitable aqueous solution of an azo component. A particularly satisfactory process is that wherein the developing solution is acid and contains a salt of a strong base and a weak acid, as described in British specification No. 425,235, but the invention is not limited to this particular process of development.

The new compounds the making of which is also a feature of the invention, are obtained by the interaction in acid solution of a 2:5-dialkoxyaniline with benzaldehyde. As the invention, regarded as that of the use of novel compounds in starting out materials in the production of light-sensitive layers, has as a feature that a diamino compound of particular structure is used, it is immaterial whether this compound is made by use of benzaldehyde or by use of a benzaldehyde carrying substituents other than those (e. g. carboxy or sulpho groups), which would confer solubility in water. Accordingly, instead of benzaldehyde such substituted benzaldehydes as the chlorobenzaldehydes, the nitrobenzaldehydes, the tolualdehydes, may be used, but benzaldehyde is preferred on grounds of economy.

As 2:5-dialkoxyanilines are understood 2:5-dimethoxy- or 2:5 diethoxy-aniline, but instead of methyl or ethyl other alkyl groups, such as propyl or butyl may be present.

The following examples illustrate but do not limit the invention. The parts are by weight.

EXAMPLE 1

*Preparation of 4:4'-diamino-2:2'-5:5'-tetramethoxy-triphenylmethane*

76.6 parts of 2:5-dimethoxyaniline are dissolved in 101 parts of 36% hydrochloric acid and 400 parts of water. 29.2 parts of benzaldehyde are added and the whole boiled with agitation under reflux for 7 hours. On cooling, the hydrochloride of the diamine separates as a white crystalline solid. It is filtered off, washed with a small quantity of 10% brine, and finally suspended in water and basified by addition of caustic soda. The precipitated diamine is filtered, washed with water and dried. The yield is good and the compound has M. P. 150° C. When recrystallized from alcohol it has M. P. 156° C.

The above compound may also be made as described in the following example.

EXAMPLE 2

65 parts of 2:5-diethoxyaniline are dissolved in dilute sulphuric acid made by mixing 330 parts of water and 66 parts of sulphuric acid (sp. gr. 1.84), and 22 parts of benzaldehyde are added. The mixture is heated with stirring, conveniently in a vessel fitted with a reflux condenser, for 2 hours at 85–90° C. The mixture is cooled. The sulphate of 4:4'-diamino-2:2'-5:5'-tetraethoxy-triphenylmethane, which is sparingly soluble in water, separates from the reaction mixture as it cools and is filtered off. The paste is gradually stirred into a sufficiency of hot dilute aqueous sodium carbonate solution. The base is thus set free; the mixture is cooled, filtered and the base (M. P. 131–132° C.) is washed with water, and dried.

EXAMPLE 3

*Tetrazotization of 4:4'-diamino-2:2'-5:5'-tetramethoxytriphenylmethane and application to a base*

19.7 parts of the above diamine are dissolved in 6.7 parts of 36% hydrochloric acid and 180 parts of water. The solution is cooled to 10° C. and tetrazotization is effected by gradual addition of a 10% aqueous solution of 6.9 parts sodium nitrite. Excess of urea is added to destroy nitrous acid, then 10 parts of tartaric acid are added and the whole made up to 1000 parts with water. Paper is coated by dipping, brushing or spraying with this solution, and dried. These operations are carried out in darkness.

EXAMPLE 4

*Printing and developing*

Sheets of paper or other suitable material coated as described, are exposed to daylight behind a photographic negative or stencil and developed by immersion in a bath composed of 1.25 parts phloroglucinol, 0.25 part resorcinol, 60 parts sodium benzoate and 300 parts of water.

The print obtained is bluish-black on a white background.

EXAMPLE 5

Paper coated as above, exposed and developed in a bath of 1.2 parts phloroglucinol, 1.0 part tartaric acid, 50 parts sodium acetate crystals and 300 parts water gives a violet-black print on a white background.

EXAMPLE 6

A reddish-brown print may be obtained by using a developing bath of the composition: 3 parts resorcinol, 1 part tartaric acid, 30 parts sodium formate and 300 parts of water.

EXAMPLE 7

A bluish-brown print may be obtained by using a developing bath of the composition: 1 part phloroglucinol, 10 parts borax, 200 parts of water.

EXAMPLE 8

4:4' - diamino-2:2'-5:5'-tetraethoxytriphenylmethane is tetrazotized in the same manner as the methoxy analogue (Example 3). Paper coated with this tetrazo solution and developed with the various developers described in Examples 4 to 7 gives prints of similar but deeper shades.

We claim:

1. A process for the manufacture of new diamino compounds which comprises interacting in acid medium a 2:5-dialkoxy-aniline with a benzaldehyde which is free from water-solubilizing substituent groups.

2. A process as claimed in claim 1 wherein a 2:5-dialkoxy aniline is caused to interact with a one-half molecular proportion of benzaldehyde.

3. The process which comprises dissolving 2:5-dimethoxy aniline in hydrochloric acid, incorporating benzaldehyde, boiling the mixture under reflux for about seven hours, basifying the diamine hydrochloride, and tetrazotizing the diamine.

4. The process which comprises dissolving 2:5-dimethoxy-aniline in an acid medium, incorporating a benzaldehyde free from water-solubilizing substituents, boiling under reflux, and splitting off the acid group from the acidified diamine.

5. The process which comprises dissolving 2:5-dimethoxy-aniline in acid medium, incorporating a benzaldehyde free from water-solubilizing substituents, heating, and basifying the product.

6. The process which comprises reacting dialkoxy-aniline in acid medium with a benzaldehyde free from water-solubilizing substituents, and isolating and basifying the product.

7. The process which comprises dissolving 2:5-diethoxy-aniline in sulfuric acid, incorporating a benzaldehyde free from water-solubilizing substituents, boiling under reflux, isolating and basifying the diamine sulfate, and tetrazotizing the diamine.

8. The process which comprises reacting 2:5-diethoxy-aniline in acid medium with a benzaldehyde free from water-solubilizing substituents and basifying the product.

9. The process which comprises reacting 2:5-diethoxy-aniline with a benzaldehyde free from water-solubilizing substituents, and isolating the diamine.

10. The process which comprises reacting 2:5-dialkoxy-aniline in acid medium with a benzaldehyde free from water-solubilizing substituents.

11. 4:4'-diamino-2:2'-5:5'-tetramethoxy - triphenylmethane.

12. Tetrazotized 4:4'-diamino-2:2'-5:5'-tetramethoxy-triphenylmethane.

13. 4:4'-diamino-2:2' - 5:5' - tetraethoxy - triphenylmethane.

14. 4:4'-diamino-2:2'-5:5'-tetra - alkoxy - triphenylmethane.

15. Tetrazotized 4:4'-diamino-2:2'-5:5'-tetraalkoxy-triphenylmethane.

16. 4:4'-diamino-2:2'-5:5'-tetra-alkoxytriarylmethane.

17. Tetrazotized 4:4'-diamino-2:2'-5:5'-tetraalkoxy-triarylmethane.

18. 4:4'-diamino - 2:2'-5:5'-tetra - alkoxy - diphenylarylmethane.

19. Tetrazotized 4:4'-diamino-2:2'-5:5'-tetraalkoxy-diphenylarylmethane.

PERCY THOMAS GALE.
WILFRED ARCHIBALD SEXTON.